US009529826B2

(12) United States Patent
Harp et al.

(10) Patent No.: US 9,529,826 B2
(45) Date of Patent: Dec. 27, 2016

(54) METHODS AND SYSTEMS FOR USE OF A DATABASE OF THREE-DIMENSIONAL (3D) OBJECT DATA MODELS FOR SEARCH QUERIES

(71) Applicant: Google Inc., Mountain View, CA (US)

(72) Inventors: Andrew Logan Harp, New York, NY (US); James Joseph Kuffner, Sunnyvale, CA (US); Anthony Gerald Francis, San Jose, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 14/141,144

(22) Filed: Dec. 26, 2013

(65) Prior Publication Data

US 2015/0186418 A1 Jul. 2, 2015

(51) Int. Cl.
*G06F 17/30* (2006.01)
(52) U.S. Cl.
CPC .............. *G06F 17/30259* (2013.01)
(58) Field of Classification Search
USPC ................................. 707/723, 766
See application file for complete search history.

(56) References Cited

U.S. PATENT DOCUMENTS

| | | | | |
|---|---|---|---|---|
| 8,229,948 B1 * | 7/2012 | Ershov | ............. | G06F 17/30867 707/765 |
| 8,566,705 B2 * | 10/2013 | Berkner | ............ | G06F 17/30713 715/200 |
| 8,571,358 B2 * | 10/2013 | Zhao | ................. | G06F 17/30256 382/305 |
| 8,589,410 B2 * | 11/2013 | Sud | ................... | G06F 17/30864 707/748 |
| 8,594,437 B2 * | 11/2013 | Watanabe | ......... | G06F 17/30277 382/103 |
| 8,600,153 B2 * | 12/2013 | Gershon | ............ | G06F 17/3025 382/162 |
| 2010/0262616 A1 * | 10/2010 | Eskolin | ............ | G06F 17/30247 707/769 |
| 2011/0173569 A1 * | 7/2011 | Howes | ............. | G06F 17/30902 715/835 |
| 2011/0276556 A1 * | 11/2011 | Meier | ................ | G06F 17/3087 707/706 |
| 2012/0166431 A1 * | 6/2012 | Brewington | ...... | G06F 17/30241 707/724 |
| 2013/0132359 A1 * | 5/2013 | Lee | ................... | G06F 17/30867 707/706 |
| 2013/0218706 A1 * | 8/2013 | Duncan | ................. | G06Q 10/06 705/26.3 |

* cited by examiner

*Primary Examiner* — Kim Nguyen
(74) *Attorney, Agent, or Firm* — McDonnell Boehnen Hulbert & Berghoff LLP (57) ABSTRACT

A server may receive a search query indicative of an object. The server may identify a 3D model from within a database of 3D object data models that corresponds to the object. The 3D model may be associated with information that pertains to the object. The server may determine an updated search query based on the information associated with the 3D model. The updated search query may be indicative of one or more of an environment of the object, an orientation of the object in the environment, a position of the object in the environment, or an identification of one or more other objects in the environment. The server may provide one or more search query results that include data pertaining to the object based on the updated search query.

20 Claims, 7 Drawing Sheets

FIGURE 7

METHODS AND SYSTEMS FOR USE OF A DATABASE OF THREE-DIMENSIONAL (3D) OBJECT DATA MODELS FOR SEARCH QUERIES

BACKGROUND

In computer graphics, three-dimensional modeling (3D) involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

In some examples, a display of a 3D object data model may be accompanied by an interface for modifying or interacting with a rendering of the 3D object data model. A virtual view of the 3D object data model may be controlled by specifying a point of view for the 3D object data model. The point of view may be determined based on a camera position or orientation that is selected. In some instances, an orthographic projection or a perspective projection may be determined based on the camera position. In addition, lighting conditions may be selected to modify appearances of surfaces of the 3D object data model in the virtual view.

SUMMARY

In one example, a method is provided that comprises receiving, at a server, a search query indicative of an object. The method further comprises identifying a 3D model that corresponds to the object indicated by the search query from within a database of three-dimensional (3D) object data models. The 3D model may be associated with information that pertains to the object. The method further comprises determining an updated search query indicative of one or more of an environment of the object, an orientation of the object in the environment, a position of the object in the environment, or an identification of one or more other objects in the environment. Determining the updated search query may be based on the information associated with the 3D model. The method further comprises providing one or more search query results that include data pertaining to the object based on the updated search query.

In another example, a device is provided that comprises one or more processors and data storage configured to store instructions executable by the one or more processors. The instructions may cause the device to receive a search query indicative of an object. The instructions may further cause the device to identify a 3D model that corresponds to the object indicated by the search query from within a database of three-dimensional (3D) object data models. The 3D model may be associated with information that pertains to the object. The instructions may further cause the device to determine an updated search query indicative of one or more of an environment of the object, an orientation of the object in the environment, a position of the object in the environment, or an identification of one or more other objects in the environment. The device may determine the updated search query based on the information associated with the 3D model. The instructions may further cause the device to provide one or more search query results that include data pertaining to the object based on the updated search query.

In yet another example, a non-transitory computer readable medium is provided. The non-transitory computer readable medium may have instructions stored therein that when executed by a computing device cause the computing device to perform functions. The functions comprise receiving a search query indicative of an object. The functions further comprise identifying a 3D model that corresponds to the object indicated by the search query from within a database of three-dimensional (3D) object data models. The 3D model may be associated with information that pertains to the object. The functions further comprise determining an updated search query indicative of one or more of an environment of the object, an orientation of the object in the environment, a position of the object in the environment, or an identification of one or more other objects in the environment. Determining the updated search query may be based on the information associated with the 3D model. The functions further comprise providing one or more search query results that include data pertaining to the object based on the updated search query.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

In some examples, a visual search system may receive a search query indicative of an object, and may provide one or more search query results that include data that pertains to the object. In one example, the visual search system may receive the search query comprising the text "cat," and may provide the one or more search query results that include images or videos of cats. In another example, the visual search system may receive the search query comprising an image of a cereal box, and may provide the one or more search query results to include data such as related webpages, database entries, images of other cereal boxes, listings of the cereal box in nearby stores, etc. Additionally, in some examples, the visual search system may classify, rank, or cluster the one or more search query results based on factors such as relevance to the search query. In the example of the cereal box, the visual search system may sort the one or more search results to include other images of the cereal box, followed by images of other cereal boxes, and then followed by webpages that include recipes for the cereal box, for example.

Within examples herein, systems, methods and devices are provided for improving visual search based on information included in a database of three-dimensional (3D) object data models. For example, the visual search system described above may identify a 3D model in the database of 3D object data models that corresponds to the object in the search query. Further, in some examples, the visual search system may obtain information associated with the 3D model such as manufacturer name, suggested webpage, pose (e.g., orientation) of the object, scale of the object, environment of the object, lighting conditions in the environment, other information such as metadata associated with the 3D model, etc. In some examples, the visual search system may also identify one or more other objects in the environment of the object based on the information from the 3D model database. In some examples, the visual search system may update the search query to include such information or may arrange the one or more search query results in an order based on the information associated with the 3D model. Additionally, in some examples, the visual search system may provide one or more images of virtual views of the 3D model in the one or more search query results.

Thus, example methods and systems herein may augment search capabilities of a visual search system based on information in a database of 3D object data models.

Figure 1:
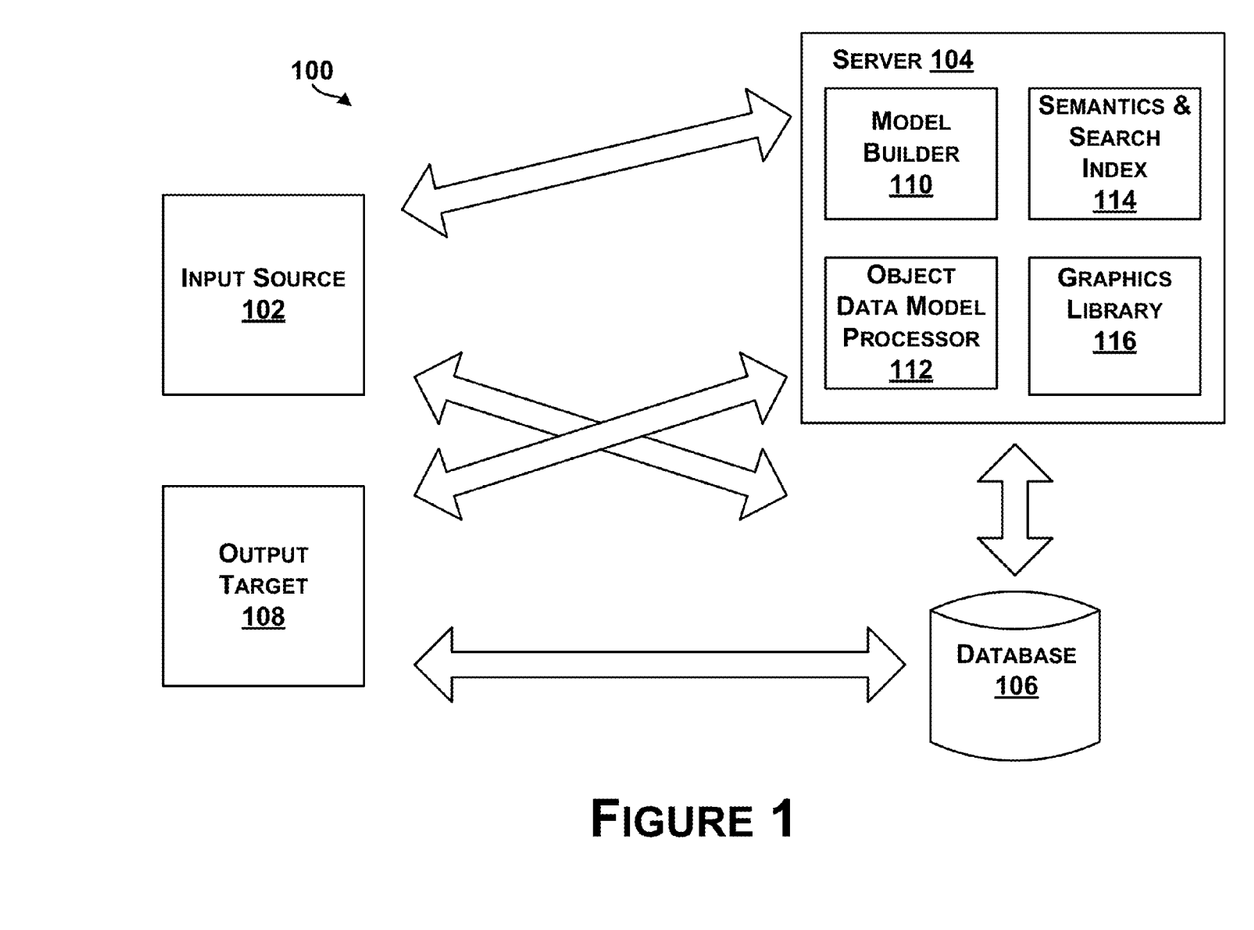
FIG. 1 illustrates an example system for object data modeling, in accordance with at least some embodiments described herein.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with vendors or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an combined model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV unwrapping to generate a mesh (D) with UV unwrapping but no colors. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may include mesh compression to reduce a mesh file size, for example. The graphics library 116 may provide the 3D object data model in a form for display on a browser, for example. In some examples, a 3D object data model viewer may be used to display images of the 3D object data models. The 3D object data model viewer may be implemented using WebGL within a web browser, or OpenGL, for example.

The database 106 may store all data sets for a 3D object data model in any number of various forms from raw data captured to processed data for display. In some examples, the stored data may include information such as metadata, keywords, or other information configured to identify or describe the object associated with the 3D object data model.

The output target 108 may include a number of different targets, such as a webpage on the Internet, a search engine, a database, etc. The output target 108 may include a 3D object data model viewer that enables product advertisements or product searches based on the 3D object data model, for example.

Within examples herein, the system 100 may be used to acquire data of an object, process the data to generate a 3D object data model, render the 3D object data model, and provide information associated with the 3D object data model.

Figure 2:
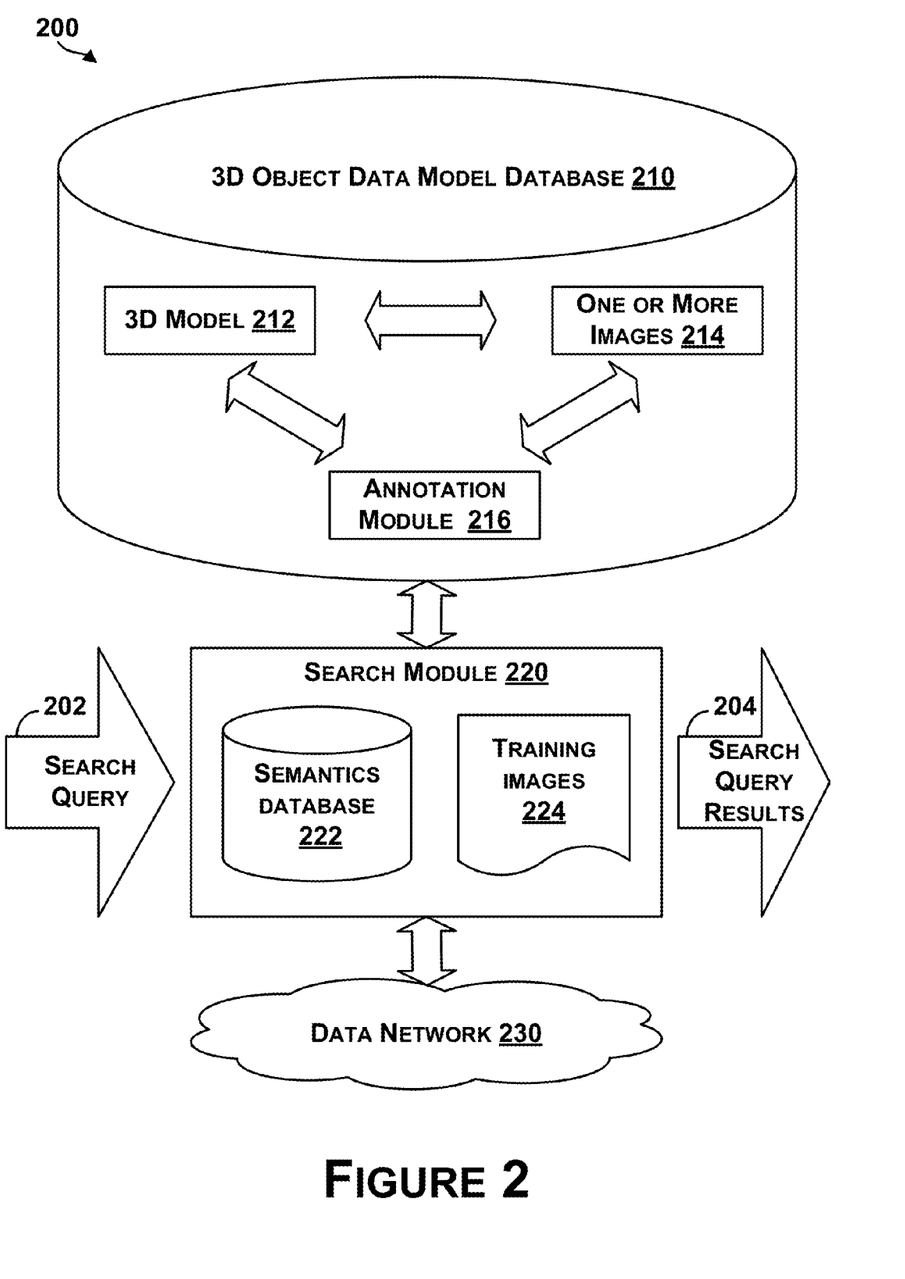
FIG. 2 illustrates an example visual search system, in accordance with at least some embodiments described herein.

FIG. 2 illustrates an example visual search system 200, in accordance with at least some embodiments described herein. The system 200 includes a 3D object data model database 210, a search module 220, and a data network 230. In some examples, the components 210, 220 and 230 in the system 200 may include any type of processor and/or any type of memory for executing functions of the components or storing instructions/data for executing the functions of the components. In some examples, the system 200 may receive a search query 202 and provide one or more search query results 204 based on the search query 202. For example, the search query results 204 may include data obtained from the data network 230 that pertains to an object indicated in the search query 202.

In some examples, the 3D model database 210 may be configured to perform the functions described for the system 100. For example, the 3D model database 210 may be configured to generate a 3D object data model 212, render the 3D model 212, and/or provide information associated with the 3D model 212. Although illustrated in FIG. 2 that the 3D model database 210 includes one 3D model 212, in some examples, the 3D model database 210 may include additional 3D models. For example, the 3D model database 210 may include data that describes a plurality of 3D models similarly to the database 106 of the system 100. Thus, in some examples, the function, structure, and implementation of the 3D model 212 may be similar to the 3D object data model described in the system 100.

In some examples, the 3D model database 210 may include one or more images 214 indicative of virtual views of the 3D model 212. For example, the one or more images 214 may be rendered similarly to the views rendered by the object data model processor 112 of the system 100 in FIG. 1. For example, a given image of the one or more images 214 may indicate a virtual view of the 3D model 212 in a given orientation (e.g., pose), a given position (e.g., scale), and/or given lighting conditions (e.g., direction of light, intensity of light, color of light, etc.).

In some examples, the 3D model database 210 may include an annotation module 216 configured to associate information identifying an object that corresponds to the 3D model 212. For example, the 3D model 212 may represent a stapler, and the annotation module 216 may be configured to associate information to the 3D model 212 such as shape of the stapler, texture of a surface of the stapler, colors on the surface of the stapler, size (e.g., dimensions) of the stapler, etc. Additionally, for example, the associated information may include text that corresponds to a description (e.g., identification information) of the stapler, a manufacturer of the stapler, a webpage associated with the stapler, a price of the stapler, etc. In some examples, the information associated by the annotation module 216 may include information relevant to the one or more images 214. For example, the information may indicate the given orientation (e.g., pose), the given position (e.g., scale), and/or the given lighting conditions associated with the given image of the one or more images 214.

Although illustrated in FIG. 2 that functional blocks described as the 3D model 212, the one or more images 214, and the annotation module 216 are included in the 3D model database 210, in some examples, the functional blocks may be implemented as separate components. For example, the 3D model database 210 may be configured similarly to the database 106 of the system 100 to include a plurality of 3D models such as the 3D model 212. Additionally, for example, the one or more images 214 may be implemented as files stored on a server or other computing device with identifiers that indicate the 3D model 212. Additionally, for example, the annotation module 216 may be implemented as a separate software component configured to access the 3D model 212 and the one or more images 214 to associate the information described herein.

In some examples, the search module 220 may be configured to receive the search query 202 and obtain data from the data network 230 to generate the search query results 204 based on the search query 202. For example, the search module 220 may be implemented as a search engine accessible via a web page or other software/hardware interface to perform the search functions described above. To facilitate performing the search functions, in some examples, the search module 220 may include a semantics database 222 and training images 224. In some examples, the semantics database 222 may include words that are associated with information included in the search query 202. For example, the search query 202 may include text such as "tiger" and the semantics database 222 may include words that include types of tigers (e.g., Siberian tiger, etc.) such that the search module 220 may obtain images of different types of tigers and arrange them by type in the search query results 204. In some examples, the semantics database 222 may include shapes associated with objects. For example, the search query 202 may include an image of a box with features on a given surface, and the search module 220 may associate the features with a cereal box based on shape-matching the features with corresponding shapes in the semantic database 222 to generate the search query results 204 including images of the cereal box obtained from the data network 230.

In some examples, the training images 224 may facilitate the search functions of the search module 220. For example, the training images 224 may comprise images of an object generated by a camera from various directions under various lighting conditions. For example, such images may be provided by a manufacturer of the object to identify and/or promote the object. For example, a manufacturer of a car may provide images of a front side, back side, and/or top side of the car, and such images may be included in the training images 224. In an example scenario, the search query 202 may include at least one input image that includes the car, and the search module 220 may identify the car by matching the at least one input image with one of the training images 224, and provide the search query results 204 that include other images of the car obtained from the data network 230. For example, the at least one image may include multiple images of the car from various angles. In some examples, the at least one input image may include 3D information (e.g., depth information) such as information provided by a 3D camera. In some examples, the search query 202 may include one or more videos of the car.

In some examples, the search functions of the search module 220 may be improved based on the information from the 3D model database 210 (e.g., the information associated by the annotation module 216). For example, the search module 220 may generate an updated search query based on the search query 202 and the information associated by the annotation module 216. Further, for example, the search module 220 may generate the search query results 204 based on the updated search query.

In one example, the search query 202 may include the text "sports car," and the search module 220 may identify one or more 3D models in the 3D model database 210 that have corresponding text (e.g., "sports car") in the associated information. For example, the search module 220 may obtain images of particular sport cars identified in the 3D model database from the data network 230, and include the obtained images in the one or more search query results 204. In some examples, the obtained images may be matched based on a comparison of metadata, alt text, caption text, and/or text in a webpage that includes the obtained images with the information from the 3D model database 210. Additionally, for example, the 3D model 212 may represent a given sports car, and the search module 220 may include the one or more images 214 of the given sports car in the one or more search query results 204. Thus, in some examples, the information associated by the annotation module 216 may augment the information included in the semantics database 222 to improve the search query results 204, or the information may be included in the search query results 204.

In another example, the search query 202 may include an input image of a black cat. In some examples, the search module 220 may be unable to identify the black cat by matching the input image with one of the training images 224. For example, the training images 224 may not include images of other cats, or may not include an image having the particular pose, scale, and/or lighting conditions of the black cat in the input image. Alternatively, for example, the training images 224 may include an image of a gray cat and may associate the input image mistakenly to the gray cat. In some examples, the one or more images 214 corresponding to the 3D model 212 may include an image of the black cat having given pose, scale, and/or lighting conditions similar to the corresponding pose, scale, and/or lighting conditions of the black cat in the input image. Thus, for example, the search module 220 may identify the black cat in the input image based on a comparison of the input image with the one or more images 214 in the 3D model database 210. For example, based on the identification using the information associated with the 3D model 212, the search module 220 may generate the search query results 204 that include data (e.g., webpages, documents, images, videos, etc.) from the data network 230 that are relevant to black cats. Additionally or alternatively, in some examples, the search query results 204 may be arranged based on the information associated with the 3D model 212. For example, search query results 204 indicative of images of black cats having the given pose, scale, and/or lighting conditions may have a higher order in the search query results 204 than images having other poses, scales, and/or lighting conditions. Thus, in some examples, the information associated by the annotation module 216 may augment the training images 224 to improve the search query results 204, or the information may be included in the search query results 204 (e.g., include the one or more images 214 in the search query results 204).

In some examples, the updated search query determined by the search module 220 may be indicative of an environment of the object, an orientation of the object in the environment, a position of the object in the environment, or an identification of one or more other objects in the environment.

In one example, the search query 202 may include the text "tiger" and the search module 220 may obtain the information associated with the 3D model 212 of a tiger that indicates possible environments where the tiger may reside. Thus, in this example, the search query results 204 may be arranged by the search module 220 to include, from the data network 230, videos of tigers in jungles followed by videos of tigers in zoos. In some examples, identifying the videos described above by the search module 220 may also be based on the one or more images 214. For example, the data network 230 may include a video database, and the search module 220 may identify the videos by comparing the one or more images 214 with frames in given videos of the video database. In some examples, such comparison may yield more results than a corresponding comparison based on the training images 224. For example, the one or more images 214 may include images having various orientations (e.g., poses), lighting conditions, and/or scales that are not included in the training images 224.

In another example, the search query 202 may include an input image of a cereal box. In this example, the search module 220 may match the input image with a given image of the one or more images 214 and thus associate the input image with the 3D model 212. Further, in this example, the given image may be associated with information such as size of the cereal box, orientation of the cereal box, and/or lighting conditions in the environment of the cereal box. For example, texture information of the 3D model 212 along with a shadow of the cereal box in the input image may be utilized to determine the direction and/or intensity of light in the environment of the cereal box in the input image. Additionally, for example, pose and scale information of the given image may be utilized to determine camera parameters of the camera that generated the input image. For example, distance and orientation of the camera relative to the cereal box may be inferred based on the information associated with the given image. Additionally, for example, one or more other objects surrounding the cereal box may be determined based on the position of the cereal box, the orientation of the cereal box, and/or the lighting conditions in the environment of the cereal box that were determined as described above. For example, the scale of the input image along with the lighting conditions may allow the search module 220 to match the one or more other objects with one or more 3D models included in the 3D model database. Thus, for example, the search query results 204 may be configured based on the additional inferred information. In a first example, the search module 220 may determine that the cereal box is on a kitchen table that has a refrigerator in the background of the input image. Thus, for example, the search query results 204 may be configured to include webpages for recipes that include the cereal box. In a second example, the search module 220 may determine that the cereal box is in a store aisle along with other cereal boxes (e.g., the one or more other objects) and thus, the search query results 204 may be configured to include price listings of the cereal box in the store and/or in other stores.

In some examples, the information associated by the annotation module 216 may allow the search module 220 to receive the search query 202 with additional query modalities. For example, the search query 202 may include an input image that includes depth information. For example, the input image may be generated by a 3D camera or a camera configured to generate 3D images. In these examples, the search module 220 may further identify an object in the input image based on a comparison of the depth information of the input image with corresponding depth information associated with the 3D model 212. Thus, in some examples, using the 3D model database 210 may enable the search module 220 to perform 3D image search.

The network 230 may comprise, for example, a transport network (e.g., internet, local area network, wide area network, cellular network, broadband network, etc.). In some examples, the network 140 may comprise a packet-switched network (e.g., Internet), a database, a file server, or any other network/data storage medium that may include data that pertains to an object indicated in the search query 202.

Figure 3:
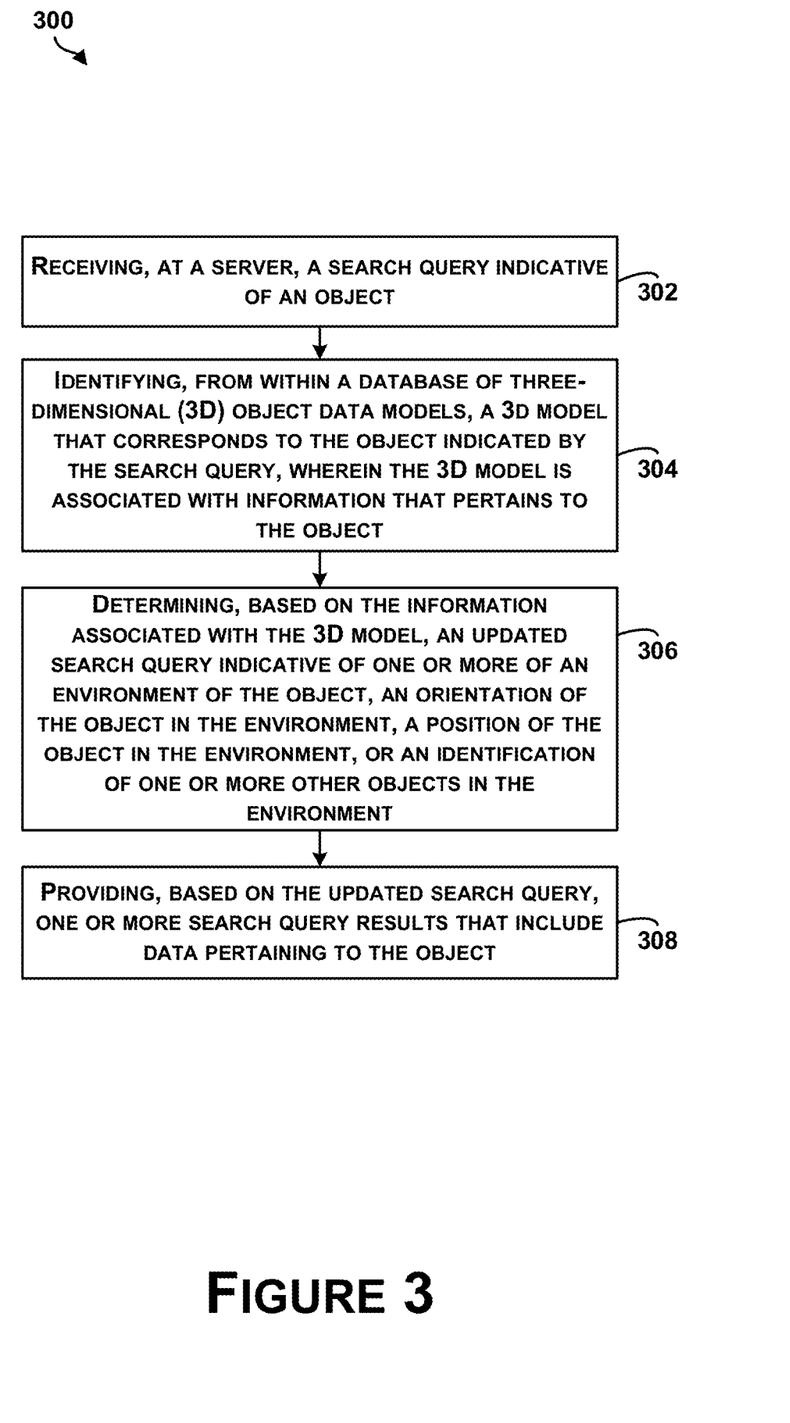
FIG. 3 is a block diagram of an example method for providing search query results, in accordance with at least some embodiments described herein.

FIG. 3 is a block diagram of an example method 300 for providing search query results, in accordance with at least some embodiments described herein. Method 300 shown in FIG. 3 presents an embodiment of a method that could be used with the system 100 or the system 200, for example. Method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving, at a server, a search query indicative of an object. For example, the search query may include text representative of the object or may include an image of the object.

At block 304, the method 300 includes identifying a 3D model that corresponds to the object indicated by the search query from within a database of three-dimensional (3D) object data models. The 3D model may be associated with information that pertains to the object. Referring to the example of the system 200, the search query may include text and the server may identify the 3D model by matching the text to the information associated with the 3D model by the annotation module 216, or the search query may include an input image of the object and the server may identify the 3D model by comparing the input image with one or more images of the 3D model (e.g., the one or more images 214). Thus, in some examples, the information associated with the 3D model may correspond to the information associated by the annotation module 216 of the system 200.

At block 306, the method 300 includes determining an updated search query indicative of one or more of an environment of the object, an orientation of the object in the environment, a position of the object in the environment, or an identification of one or more other objects in the environment. The determination may be based on the information associated with the 3D model. For example, as discussed in the system 200, the server may determine pose, scale, and/or lighting conditions of the object and may update the search query based on the determined information.

In some examples, the updated search query may comprise text included in the information associated with the 3D model that corresponds to a description of the object. For example, the text may include manufacturer information, a uniform resource locator (URL), identification information (e.g., brand name, etc.), or other information that describes the object. In some examples, the server may search a network such as the Internet for images or videos that have metadata, alt text, and/or caption text that corresponds to the text included in the information associated with the 3D model.

In some examples, the method 300 may further include determining one or more images indicative of views of the 3D model. In these examples, the updated search query may be based on the one or more images. For example, the one or more images may correspond to the one or more images 214 of the system 200 having various poses, scales, and/or lighting conditions, and the server may be configured to determine the information associated with the object based on matching the object with the 3D model associated with the one or more images.

At block 308, the method 300 includes providing one or more search query results that include data pertaining to the object based on the updated search query. For example, the one or more search query results may be obtained from a data network such as the data network 230 of the system 200 based on the updated search query. Additionally or alternatively, in some examples, the one or more search query results may include one or more images of the 3D model such as the one or more images 214 of the system 200. In some examples, the data pertaining to the object may include images, videos, or other visual information. In some examples, the data pertaining to the object may include text, webpages, documents, or other representations of data that pertains to the object.

In some examples, the method 300 may further include determining a plurality of images based on the search query by the server. In these examples, the method may further include identifying a given image from within the plurality of images based on the given image being associated with the information from the 3D model. Further, in these examples, the one or more search query results may include the given image based on the identification. For example, the search query may include text that identifies a brand name of a chocolate, and the server may identify a 3D model of the chocolate that has the brand name based on the information associated with the 3D model. Further, in this example, the server may obtain the plurality of images of chocolates from a data network such as the data network 230 of the system 200, and determine a given image of the plurality of images that corresponds to a chocolate having the brand name for inclusion in the one or more search query results.

In some examples, the method 300 may further include arranging the one or more search query results in an order based on the information associated with the 3D model. For example, where the search query includes an input image of a car, the server may identify a model of the car based on matching the input image with a given image of the 3D model. Further, in this example, the one or more search results may include documents describing cars that are arranged in the order such that the documents relevant to the identified model appear first followed by documents relevant to similar cars. Additionally or alternatively, in some examples, the position, orientation, and/or lighting conditions of the car in the input image may be determined based on a comparison between the given image and the input image. For example, the server may determine that the input image of the car was taken during night-time based on texture information of the 3D model. Thus, for example, the method 300 may arrange the one or more search query results to show night-time images or videos followed by day-time images or videos.

In some examples, the method 300 may further include determining a scale of the input image based on a comparison between the given image and the input image and the information associated with the 3D model. For example, where the lighting conditions are determined as described above, the server may identify the one or more other objects in the environment of the object (e.g., kitchen utensils around a cereal box, etc.), and may configure the one or more search query results to include data relevant to the environment of the one or more other objects (e.g., recipes of the cereal box, etc.).

In some examples, the search query may include depth information of the input image. For example, the input image may be obtained by a 3D camera. In these examples, the method 300 may further include comparing the depth information of the input image with corresponding depth information associated with the 3D model. In these examples, the method 300 may further include providing the one or more search query results based on the comparison. Referring back to the system 200, the 3D model may include the corresponding depth information, and thus the identification of the 3D model and the determination of the updated search query may be improved by comparing the depth information of the input image with the corresponding depth information of the 3D model, for example.

Figure 4A:
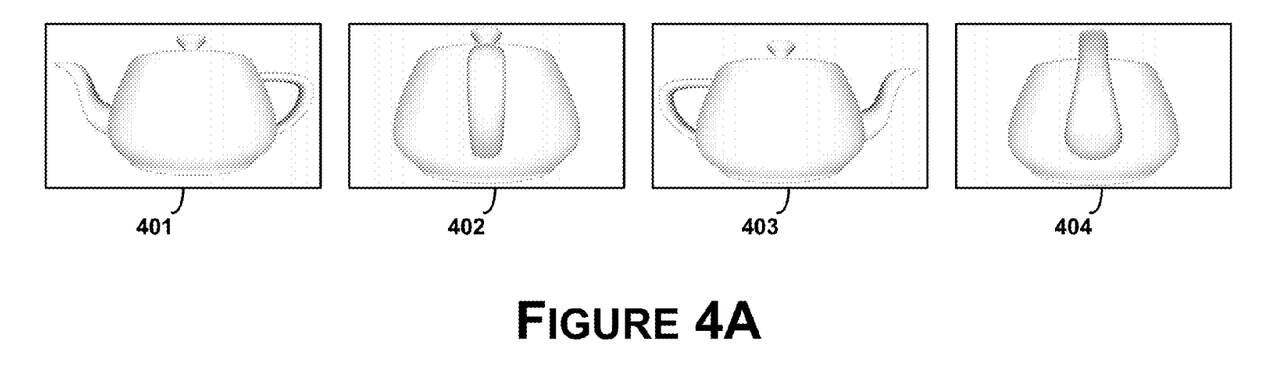
FIGS. 4A-4B illustrate example views of a 3D model, in accordance with at least some embodiments described herein.
Figure 4B:
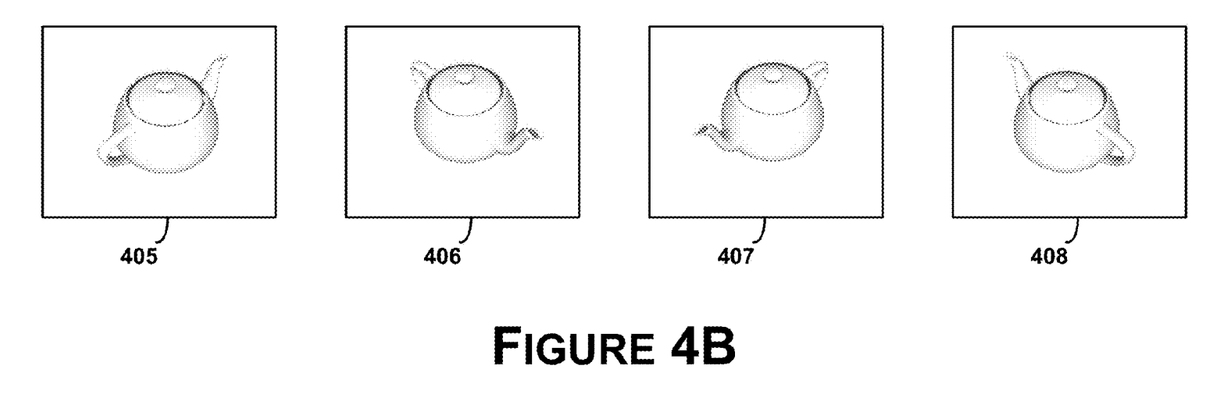

FIGS. 4A-4B illustrate example views of a 3D model, in accordance with at least some embodiments described herein. For example, FIGS. 4A-4B may illustrate one or more images of a 3D model similarly to the one or more images 214 described in the system 200 in FIG. 2. As shown in FIG. 4A, multiple images of different sides of a 3D object model may be rendered by orbiting or moving a virtual camera position around the 3D object. For instance, images 401-404 may be captured based on a virtual view which corresponds to a teapot that is presented at eye-level. For example, image 401 may be rendered based on a front view of the teapot. Similarly, for example, images 402 and 404 may be rendered based on side views of the teapot, while image 403 may be rendered based on a back view of the teapot.

As shown in FIG. 4B, images 405-408 may be rendered based on different viewpoints than the images 401-404. For example, the images 405-408 may be rendered from a high virtual camera angle such that portions of the teapot are visible from above. In one example, the images 405-408 may be rendered by modifying the virtual camera position to simulate a viewer walking around the teapot. For instance, images 405-408 may describe four separate viewpoints such that each side of the teapot, front, left side, right side, and back, is visible in at least one of the images 405-408

The images 401-408 conceptually illustrated in FIGS. 4A-4B are not meant to be limiting. In some instances, more or less images may be rendered based on any number of virtual views of a 3D object data model from any virtual camera orientation relative to the orientation of the 3D object. Thus, for example, a search module such as the search module 220 of the system 200 may identify an object in a search query by matching an input image of the object with one of the images 401-402 (e.g., the one or more images 214 of the system 200).

Figure 5:
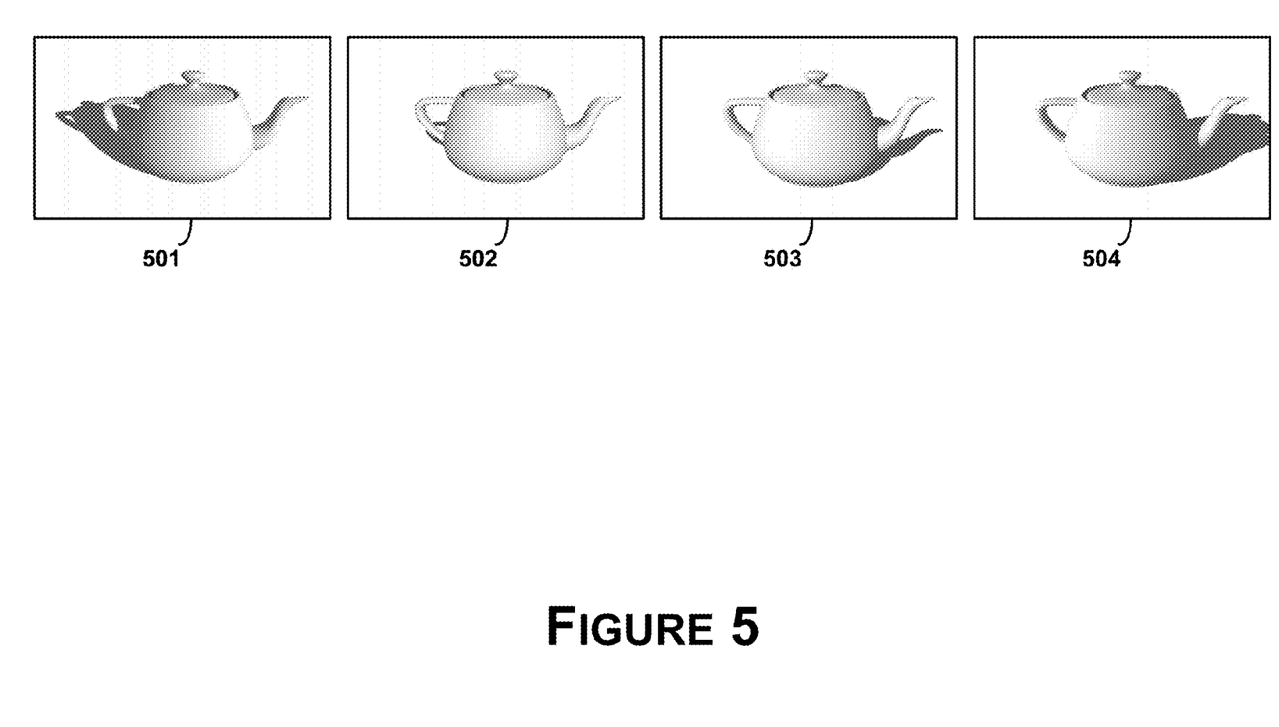
FIG. 5 illustrates other example views of a 3D model, in accordance with at least some embodiments described herein.

FIG. 5 illustrates other example views of a 3D model, in accordance with at least some embodiments described herein. Similarly, FIG. 5 may illustrate one or more images of the 3D model similarly to the one or more images 214 described in the system 200 in FIG. 2. As shown in FIG. 5, multiple images of an object may be rendered based on various lighting conditions for the object, for example. The images 501-504 conceptually illustrate varying lighting conditions associated with virtual views from which images of a teapot (e.g., 3D model) may be rendered. The image 501, for example, is rendered based on camera position that is above the teapot with light illuminating a side of the teapot near a spout of the teapot. Similarly, images 502-504 illustrate light illuminating different locations on the surface of the teapot. In one example, the images 501-504 may represent renderings of the teapot in a fixed position as a position of an illumination source, such as sunlight, varies. In other examples, the images 501-504 may be rendered without shadows or with multiple illumination sources. In another example, the images 501-504 may be rendered according to different parameters for reflection or shading models of a 3D object. Thus, for example, based on a comparison of the images 501-504 with an input image of a teapot, the lighting conditions (e.g., direction of light, intensity of light, etc.) may be determined. In some examples, identifying the lighting conditions may facilitate identifying one or more other objects around the teapot in the input image. In the example of the system 200, the search query results 204 may be arranged based on the identified one or more other object, or may be otherwise improved as described in the system 200.

Figure 6:
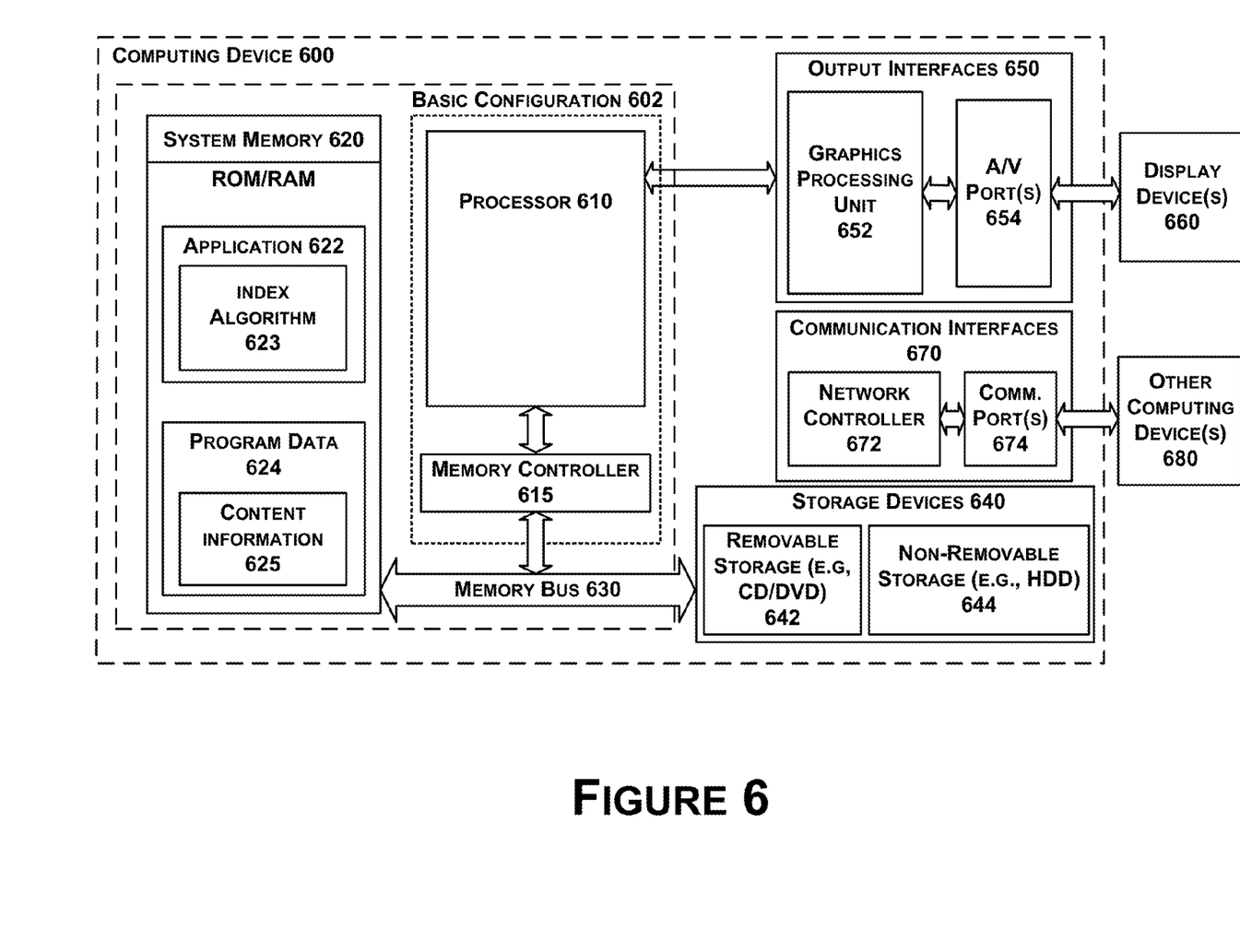
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for rendering virtual views of three-dimensional (3D) data object models as described in FIGS. 1-5. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (μP), a microcontroller (μC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include an index algorithm 623 that is arranged to provide inputs to the electronic circuits, in accordance with the present disclosure. Program data 624 may include content information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the computing device 600.

Computing device 600 can also include output interfaces 650 that may include a graphics processing unit 652, which can be configured to communicate to various external devices such as display devices 660 or speakers via one or more A/V ports 654 or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Figure 7:
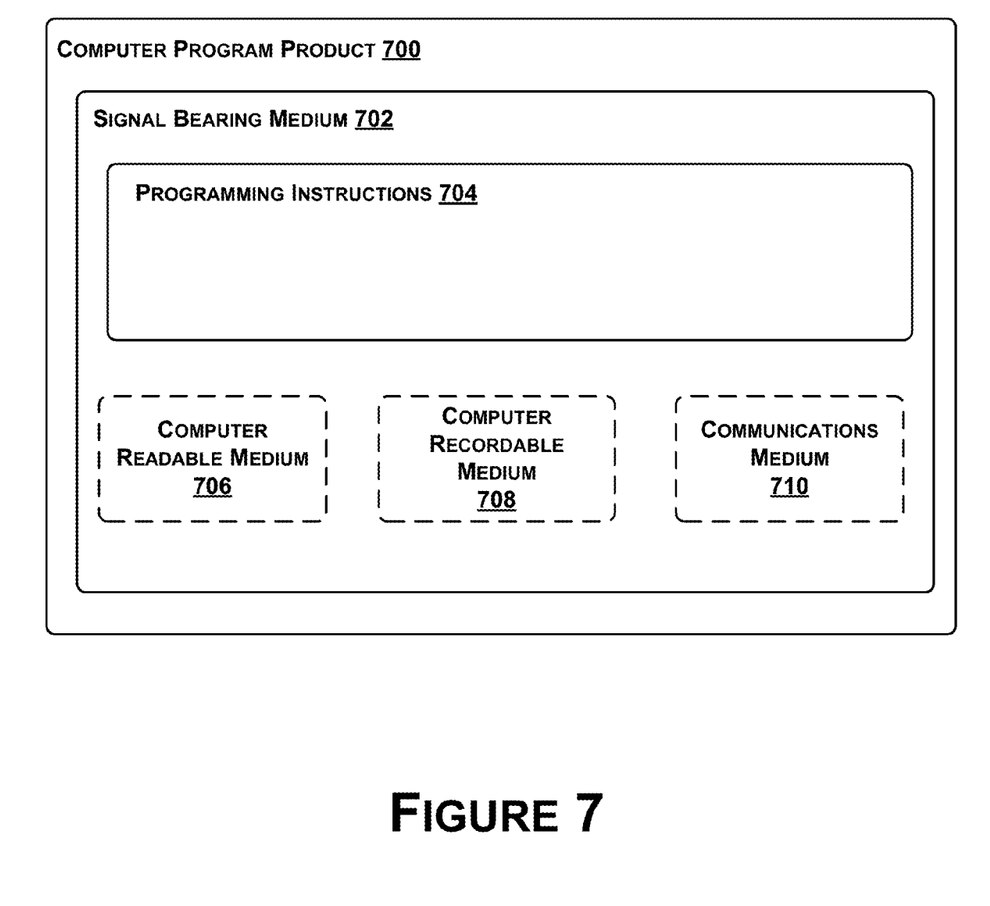
FIG. 7 depicts an example computer readable medium configured according to at least some embodiments described herein.

FIG. 7 depicts an example computer-readable medium configured according to at least some embodiments described herein. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. method 300) may be implemented by computer program instructions encoded on a computer readable storage media in a machine-readable format, or on other media or articles of manufacture (e.g., the instructions stored on system memory 620 of the computing device 600). FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 702 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, at a server, a search query indicative of an object;
   in response to receiving the search query, accessing a database of three-dimensional (3D) models of objects, wherein a respective 3D model in the database includes data characterizing surface geometry and texture of a respective object in 3D space;
   identifying, from within the database, a 3D model that corresponds to the object indicated by the search query, wherein the database associates the 3D model with stored information pertaining to the object characterized by the 3D model;
   determining, based on the stored information associated with the 3D model, an updated search query indicative of one or more of an environment of the object, an orientation of the object in the environment, a position of the object in the environment, or an identification of one or more other objects in the environment; and
   providing, based on the updated search query, one or more search query results pertaining to the object.

2. The method of claim 1, wherein the updated search query comprises text included in the information associated with the 3D model that corresponds to a description of the object.

3. The method of claim 1, further comprising:
   determining, by the server, a plurality of images based on the search query; and
   identifying, from within the plurality of images, a given image based on the given image being associated with the information from the 3D model, wherein the one or more search query results include the given image.

4. The method of claim 1, further comprising:
   arranging, by the server, the one or more search query results in an order based on the information associated with the 3D model.

5. The method of claim 1, further comprising:
   determining, by the server, one or more images indicative of views of the 3D model, wherein the updated search query is based on the one or more images.

6. The method of claim 5, wherein the one or more search query results include the one or more images.

7. The method of claim 5, wherein the search query comprises an input image of the object, the method further comprising:
   matching, based on a comparison between the one or more images and the input image, a given image of the one or more images to the input image, wherein identifying the 3D model that corresponds to the object is based on the matching.

8. The method of claim 7, further comprising:
   determining, based on the information associated with the 3D model and a comparison between the given image and the input image, the orientation of the object, the position of the object, and lighting conditions in the environment of the object, wherein the one or more search query results are configured based on the orientation, the position, and the lighting conditions.

9. The method of claim 8, further comprising:
   determining, based on the information associated with the 3D model and a comparison between the given image and the input image, a scale of the input image; and
   identifying, by the server, the one or more other objects in the environment based on the orientation of the object, the position of the object, the lighting conditions, and the scale.

10. The method of claim 1, wherein the search query comprises an input image of the object and includes depth information of the input image, the method further comprising:
    comparing, by the server, the depth information of the input image with corresponding depth information associated with the 3D model; and
    providing the one or more search query results based on the comparison.

11. A device comprising:
    one or more processors; and
    data storage configured to store instructions executable by the one or more processors to cause the device to:
    receive a search query indicative of an object;
    in response to receiving the search query, access a database of three-dimensional (3D) models of objects, wherein a respective 3D model in the database includes data characterizing surface geometry and texture of a respective object in 3D space;
    identify, from within the database, a 3D model that corresponds to the object indicated by the search query, wherein the database associates the 3D model with stored information pertaining to the object characterized by the 3D model;
    determine, based on the stored information associated with the 3D model, an updated search query indicative of one or more of an environment of the object, an orientation of the object in the environment, a position of the object in the environment, or an identification of one or more other objects in the environment; and
    provide, based on the updated search query, one or more search query results pertaining to the object.

12. The device of claim 11, wherein the updated search query comprises text included in the information associated with the 3D model that corresponds to a description of the object.

13. The device of claim 11, wherein the instructions executable by the one or more processors further cause the device to:
    determine a plurality of images based on the search query; and
    identify, from within the plurality of images, a given image based on the given image being associated with the information from the 3D model, wherein the one or more search query results include the given image.

14. The device of claim 11, wherein the instructions executable by the one or more processors further cause the device to:
arrange the one or more search query results in an order based on the information associated with the 3D model.

15. The device of claim 11, wherein the instructions executable by the one or more processors further cause the device to:
determine one or more images indicative of views of the 3D model, wherein the updated search query is based on the one or more images.

16. A non-transitory computer readable medium having stored therein instructions, that when executed by a computing device, cause the computing device to perform functions, the functions comprising:
receiving, at the computing device, a search query indicative of an object;
in response to receiving the search query, accessing a database of three-dimensional (3D) models of objects, wherein a respective 3D model in the database includes data characterizing surface geometry and texture of a respective object in 3D space;
identifying, from within the database, a 3D model that corresponds to the object indicated by the search query, wherein the database associates the 3D model with stored information pertaining to the object characterized by the 3D model;
determining, based on the stored information associated with the 3D model, an updated search query indicative of one or more of an environment of the object, an orientation of the object in the environment, a position of the object in the environment, or an identification of one or more other objects in the environment; and
providing, based on the updated search query, one or more search query results pertaining to the object.

17. The non-transitory computer readable medium of claim 16, wherein the updated search query comprises text included in the information associated with the 3D model that corresponds to a description of the object.

18. The non-transitory computer readable medium of claim 16, the functions further comprising:
determining, by the computing device, a plurality of images based on the search query; and
identifying, from within the plurality of images, a given image based on the given image being associated with the information from the 3D model, wherein the one or more search query results include the given image.

19. The non-transitory computer readable medium of claim 16, the functions further comprising:
arranging, by the computing device, the one or more search query results in an order based on the information associated with the 3D model.

20. The non-transitory computer readable medium of claim 16, the functions further comprising:
determining, by the computing device, one or more images indicative of views of the 3D model, wherein the updated search query is based on the one or more images.

* * * * *